(12) United States Patent
Mukhtarov et al.

(10) Patent No.: US 10,866,460 B2
(45) Date of Patent: Dec. 15, 2020

(54) DISPLAY APPARATUS

(71) Applicant: SAMSUNG ELECTRONICS CO., LTD., Suwon-si (KR)

(72) Inventors: Farid Mukhtarov, Suwon-si (KR); Dae Sik Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/694,262

(22) Filed: Nov. 25, 2019

(65) Prior Publication Data

US 2020/0166806 A1 May 28, 2020

(30) Foreign Application Priority Data

Nov. 28, 2018 (KR) .................. 10-2018-0149842

(51) Int. Cl.
*F21V 21/00* (2006.01)
*G02F 1/13357* (2006.01)

(52) U.S. Cl.
CPC .. *G02F 1/133606* (2013.01); *G02F 1/133603* (2013.01); *G02F 1/133605* (2013.01); *G02F 2001/133607* (2013.01)

(58) Field of Classification Search
CPC ........ G02B 1/133606; G02B 1/133603; G02B 1/133605; G02B 2001/133607
USPC ...................... 362/97.1, 97.2, 97.3, 555, 561
See application file for complete search history.

(56) References Cited

U.S. PATENT DOCUMENTS 7,826,703 B2 11/2010 Iwasaki
8,206,000 B2 6/2012 Tung et al.
2009/0316388 A1* 12/2009 Chang ................ G02B 6/002 362/97.1
2012/0069268 A1* 3/2012 He ................ G02F 1/133606 349/62
2015/0023050 A1* 1/2015 Chen ................ G02F 1/133609 362/555
2015/0062488 A1* 3/2015 Chen ................ G02F 1/133606 349/62
2018/0299730 A1* 10/2018 Saito ................ G02F 1/133605

FOREIGN PATENT DOCUMENTS

KR      2003-0078889 A    10/2003
KR    10-2011-0021898 A     3/2011
KR       10-1318497 B1    10/2013

OTHER PUBLICATIONS

International Search Report (PCT/ISA/210) dated Mar. 24, 2020 issued by the International Searching Authority in International Application No. PCT/KR2019/016190.

* cited by examiner

*Primary Examiner* — Laura K Tso
(74) *Attorney, Agent, or Firm* — Sughrue Mion, PLLC

(57) ABSTRACT

Disclosed is a display apparatus capable of being made thinner by reducing an optical distance OD and capable of implementing local dimming. The display apparatus includes a display panel, a light source configured to emit light toward a first direction parallel to a front surface of the display panel in order to supply the light to the display panel, and a light tunnel lens including: at least one light tunnel configured to guide the light emitted from the light source in the first direction, and a lens configured to be connected to the at least one light tunnel to diffuse the light guided by the at least one light tunnel.

18 Claims, 8 Drawing Sheets

DISPLAY APPARATUS

CROSS-REFERENCE TO RELATED APPLICATION(S)

This application is based on and claims priority under 35 U.S.C. § 119 to Korean Patent Application No. 10-2018-0149842, filed on Nov. 28, 2018, in the Korean Intellectual Property Office, the disclosure of which is incorporated by reference herein in its entirety.

BACKGROUND

1. Field

The disclosure relates to a display apparatus including a backlight for supplying light to a display panel.

2. Description of Related Art

A display apparatus is a type of an output apparatus that visually displays data information such as characters, graphics, images or the like, and may include a computer monitor, a television (TV), and the like.

The display apparatus may include a display panel formed of a liquid crystal panel and a backlight for supplying light to the display panel.

As one type of the display apparatus, there is an edge type display apparatus in which the backlight is composed of a light guide plate and light emitting diodes (LEDs) disposed on opposite sides of the light guide plate to generate light.

Because the edge type display apparatus uses a method in which light generated from the light emitting diodes is uniformly diffused through a light guide plate and then supplied to a front display panel, the edge type display apparatus is difficult to perform a local dimming function that is performed by partially limiting the amount of light supplied to some regions of the display panel.

Meanwhile, the display apparatus of a direct method (direct type) capable of performing the local dimming function may include a light source emitting light toward the display panel, and a diffusion plate uniformly diffusing the light from the light source.

It is necessary to have a predetermined optical distance (OD) between the diffusion plate and the light source.

Because the optical distance is a main factor that hinders the thinning of the direct type display apparatus, it is necessary to reduce the optical distance in order to reduce the thickness of the direct type display apparatus.

SUMMARY

Provided is a display apparatus including a backlight capable of implementing local dimming.

Also provided is a display apparatus capable of being made thinner by reducing an optical distance (OD).

Additional aspects will be set forth in part in the description which follows and, in part, will be apparent from the description, or may be learned by practice of the presented embodiments.

In accordance with an aspect of the disclosure, a display apparatus includes: a display panel; a light source configured to emit light toward a first direction parallel to a front surface of the display panel in order to supply the light to the display panel; and a light tunnel lens including: at least one light tunnel configured to guide the light emitted from the light source in the first direction, and a lens configured to be connected to the at least one light tunnel to diffuse the light guided by the at least one light tunnel.

The at least one light tunnel may include a first light tunnel connected to a first end of the lens in the first direction and a second light tunnel connected to a second end of the lens in the first direction.

The light source may include a first light source configured to emit the light toward the first light tunnel and a second light source configured to emit the light toward the second light tunnel; the light emitted from the first light source may be guided by the first light tunnel to be incident on one side of the lens and then emitted to another side of the lens; and the light emitted from the second light source may be guided by the second light tunnel to be incident on the other side of the lens and then emitted to the one side of the lens.

The light source may include a plurality of light emitting diodes; and the plurality of light emitting diodes may be spaced apart from each other along a second direction crossing the first direction and parallel to the front surface of the display panel.

The lens may have a convex shape toward the display panel.

The lens may have an elliptical cross section in which a length of a transverse axis is longer than a length of a longitudinal axis.

The display apparatus may further include a diffusion plate between the display panel and the light tunnel lens and configured to diffuse light emitted from the lens and emit the light toward the display panel.

The display apparatus may further include a first reflection plate between the diffusion plate and the at least one light tunnel and configured to reflect the light emitted by the diffusion plate back toward the diffusion plate.

The display apparatus may further include a second reflection plate disposed in the rear of the light tunnel lens and configured to reflect the light emitted backward from the light tunnel lens back toward the light tunnel lens.

The lens may include a first fine pattern configured to guide light incident on the lens to be emitted toward the display panel.

The at least one light tunnel may include a second fine pattern provided at a rear surface of the at least one light tunnel to guide the light to be emitted to a front side.

The lens and the at least one light tunnel may be integrally provided.

The display apparatus may further include a plurality of light tunnel lenses including the light tunnel lens, wherein the plurality of light tunnel lenses may be spaced apart from each other along the first direction.

The at least one light tunnel may include a first end connected to the lens and a second end on which the light from the light source is incident; and the at least one light tunnel may decrease in thickness from the first end toward the second end.

The at least one light tunnel may include a first end connected to the lens and a second end on which the light from the light source is incident; and the at least one light tunnel may have a same thickness from the first end to the second end.

In accordance with another aspect of the disclosure, a display apparatus includes: a display panel configured to output an image to a front surface thereof; and a backlight disposed in a rear of the display panel to supply light to the display panel, wherein the backlight includes: a light source array disposed along a first direction parallel to the display panel and configured to emit light in a second direction crossing the first direction and parallel to the front surface of the display panel; at least one light tunnel extending along the first direction to correspond to the light source array and configured to guide the light emitted from the light source array in the second direction; and a lens connected to the at least one light tunnel and configured to guide the light guided by the at least one light tunnel to be emitted toward a rear surface of the display panel.

The lens may have a semi-cylindrical shape extending along the first direction.

The at least one light tunnel may include a first light tunnel connected to one end of the lens in the first direction and a second light tunnel connected to another end of the lens in the first direction.

The light source array may include a first light source array configured to emit the light toward the first light tunnel and a second light source array configured to emit the light toward the second light tunnel; the light emitted from the first light source array may be guided by the first light tunnel to be incident on one side of the lens and then emitted to another side of the lens; and the light emitted from the second light source array may be guided by the second light tunnel to be incident on the other side of the lens and then emitted to the one side of the lens.

In accordance with another aspect of the disclosure, a display apparatus includes: a display panel configured to output an image to a front surface thereof; a diffusion plate disposed in a rear of the display panel to diffuse light; at least one light tunnel disposed in a rear of the diffusion plate to face the diffusion plate and configured to guide the light in a direction parallel to the diffusion plate; a lens connected to the at least one light tunnel to diffuse the light guided by the at least one light tunnel and to guide the light to the diffusion plate; and a light source configured to supply the light to the display panel and to emit the light toward a side of the at least one light tunnel.

The at least one light tunnel may include a first light tunnel connected to a first end of the lens in a first direction parallel to the front surface of the display panel, and a second light tunnel connected to a second end of the lens in the first direction.

The light source may include a first light source configured to emit the light toward the first light tunnel and a second light source configured to emit the light toward the second light tunnel; the light emitted from the first light source may be guided by the first light tunnel to be incident on one side of the lens and then emitted to another side of the lens; and the light emitted from the second light source may be guided by the second light tunnel to be incident on the other side of the lens and then emitted to the one side of the lens.

The light source may include a plurality of light emitting diodes; and the plurality of light emitting diodes may be disposed to be spaced apart from each other along a second direction crossing the first direction and parallel to the front surface of the display panel.

The display apparatus may further include a first reflection plate between the diffusion plate and the at least one light tunnel and configured to reflect the light emitted by the diffusion plate back toward the diffusion plate.

The lens may include a first fine pattern configured to guide light incident on the lens to be emitted toward the display panel; and the at least one light tunnel may include a second fine pattern provided at a rear surface of the at least one light tunnel to guide the light to be emitted to a front side.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
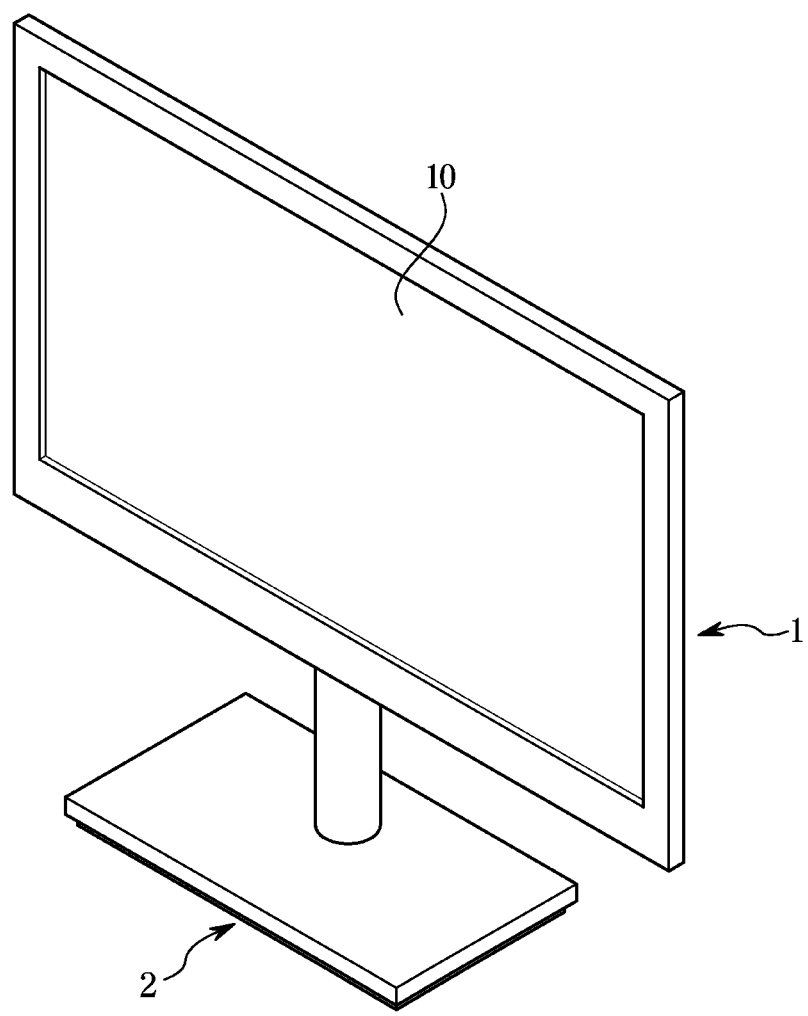
FIG. 1 is a perspective view of a display apparatus according to an embodiment of the disclosure.

Embodiments described herein and configurations shown in the drawings are only examples, and various modifications and combinations of features from different embodiments may be made.

The terms used herein are for the purpose of describing embodiments and are not intended to restrict and/or to limit the disclosure. For example, singular expressions herein may include plural expressions, unless the context clearly dictates otherwise. Also, the terms "comprises," "includes," or "has" are intended to indicate that there are features, numbers, steps, operations, elements, parts, or components thereof described in the specification, and do not exclude the presence or addition of one or more other features, numbers, steps, operations, elements, parts, or components thereof.

It will be understood that although the terms first, second, etc., may be used herein to describe various components, these components should not be limited by these terms, and the terms are only used to distinguish one component from another. For example, without departing from the scope of the disclosure, the first component may be referred to as a second component, and similarly, the second component may also be referred to as a first component.

In this specification, the terms "front," "rear," "upper," "lower," "left," and "right" are defined with reference to the drawings, and the shape and position of each component are not limited by these terms.

Hereinafter, embodiments will be described in detail with reference to the accompanying drawings.

Figure 2:
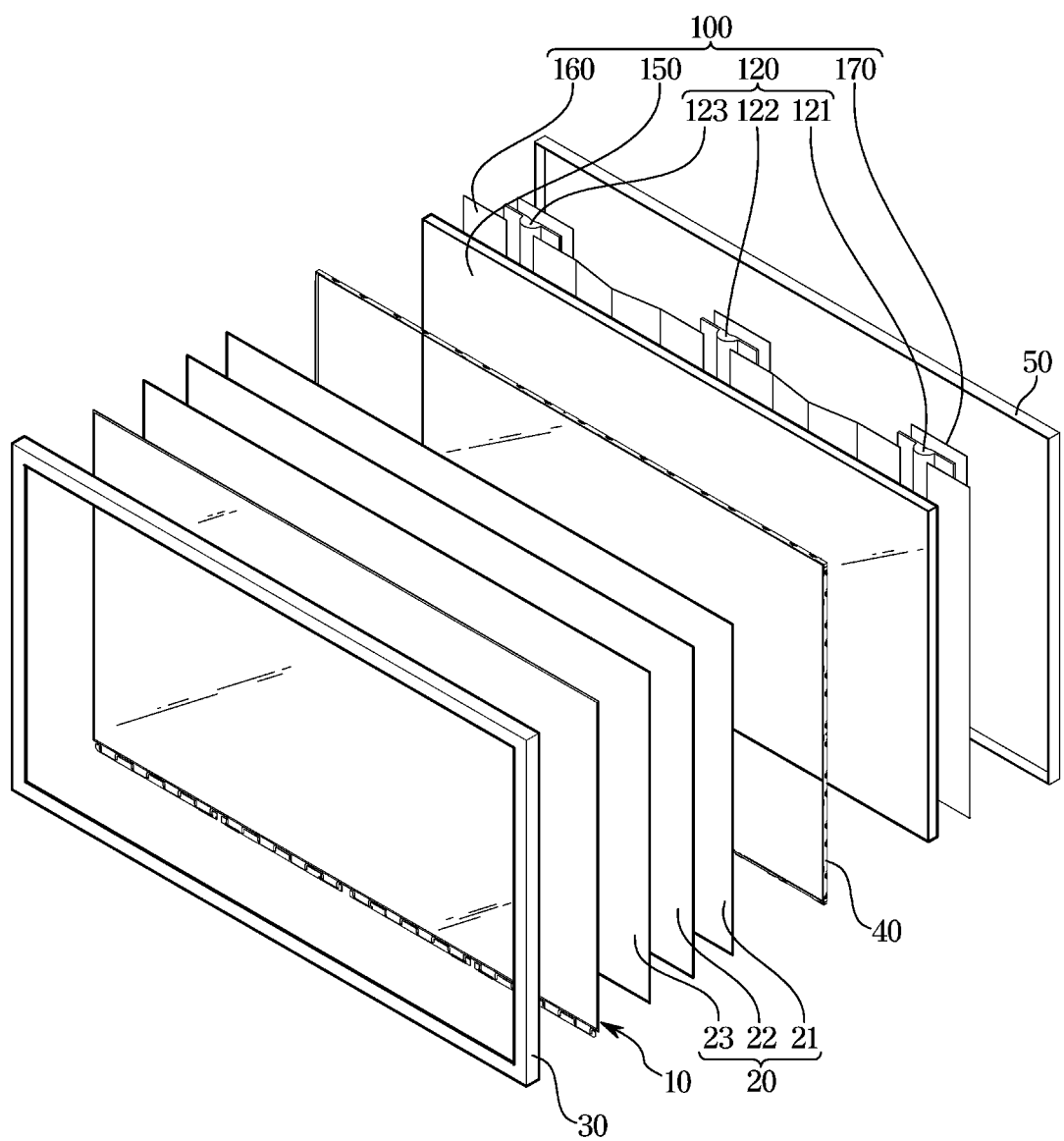
FIG. 2 is an exploded perspective view of the display apparatus according to an embodiment.

FIG. 1 is a perspective view of a display apparatus 1 according to an embodiment, and FIG. 2 is an exploded perspective view of the display apparatus 1 according to an embodiment.

Referring to FIG. 1, a display apparatus 1 may include a display panel 10 for outputting an image to a front surface and a stand 2 for supporting the display apparatus 1. The stand 2 may be mounted on a lower end of the display apparatus 1 to support the display apparatus 1. The stand 2 may be installed on a wall by a separate bracket.

Referring to FIG. 2, the display apparatus 1 may include the display panel 10 and a backlight 100 for supplying light to the display panel 10. The display apparatus 1 may also include a plurality of optical sheets 20 (21, 22, 23) disposed between the display panel 10 and the backlight 100 to improve characteristics of light supplied from the backlight 100.

The display apparatus 1 may include a case 30 (e.g., housing) forming an outer appearance of the display apparatus 1 and supporting an edge of the display panel 10, a middle mold 40 configured to support the display panel 10 and the optical sheets 20, and a bottom chassis 50 to which the middle mold 40 is coupled in the front thereof and configured to receive the backlight 100.

The case 30 may be formed in a substantially square or rectangular ring shape. The case 30 may support an edge of a front surface of the display panel 10. The case 30 may form side surfaces together with the edge of the front surface of the display apparatus 1.

The middle mold 40 may be formed in a substantially square or rectangular ring shape. The middle mold 40 may support an edge of a rear surface of the display panel 10 and the optical sheets 20.

The bottom chassis 50 may be formed in an enclosure shape with an open front surface. The bottom chassis 50 may accommodate the backlight 100 therein. The bottom chassis 50 may be formed of a metal material such as aluminum having excellent thermal conductivity.

Various printed circuit boards for controlling the display apparatus 1 may be installed on a rear surface of the bottom chassis 50. A rear case may be coupled to the rear of the bottom chassis 50 to cover the printed circuit boards and form a rear surface of the display apparatus 1.

The backlight 100 may include a diffusion plate 150 disposed in the rear of the display panel 10, a first reflection plate 160 disposed in the rear of the diffusion plate 150, a light tunnel lens 120 disposed in the rear of the first reflection plate 160, and a second reflection plate 170 disposed to face a rear surface of the light tunnel lens 120. Furthermore, a light source array 110 (refer to FIG. 3) may be disposed at opposite sides of the light tunnel lens 120.

A plurality of the light tunnel lenses 120 may be provided. For example, the light tunnel lens 120 may include a first light tunnel lens 121, a second light tunnel lens 122, and a third light tunnel lens 123, which are spaced apart from each other in a direction parallel to the display panel 10. It is understood, however, that one or more other embodiments are not limited thereto. For example, the number of light tunnel lenses 120 may vary depending on the design specifications and the size of the display panel 10.

FIG. 2 illustrates a light tunnel lens 120 extending in a longitudinal direction. In addition, FIG. 2 illustrates a plurality of light tunnel lenses 120 arranged to be spaced apart from each other in a transverse direction. It is understood, however, that one or more other embodiments are not limited thereto. For example, the light tunnel lens 120 may extend in the transverse direction, and the light tunnel lenses 120 may be arranged to be spaced apart from each other in the longitudinal direction.

The diffusion plate 150 may be formed in a rectangular plate shape having a left-right width longer than an up-down length to correspond to the display panel 10. The diffusion plate 150 may be formed of a transparent material to allow light to pass therethrough.

Figure 3:
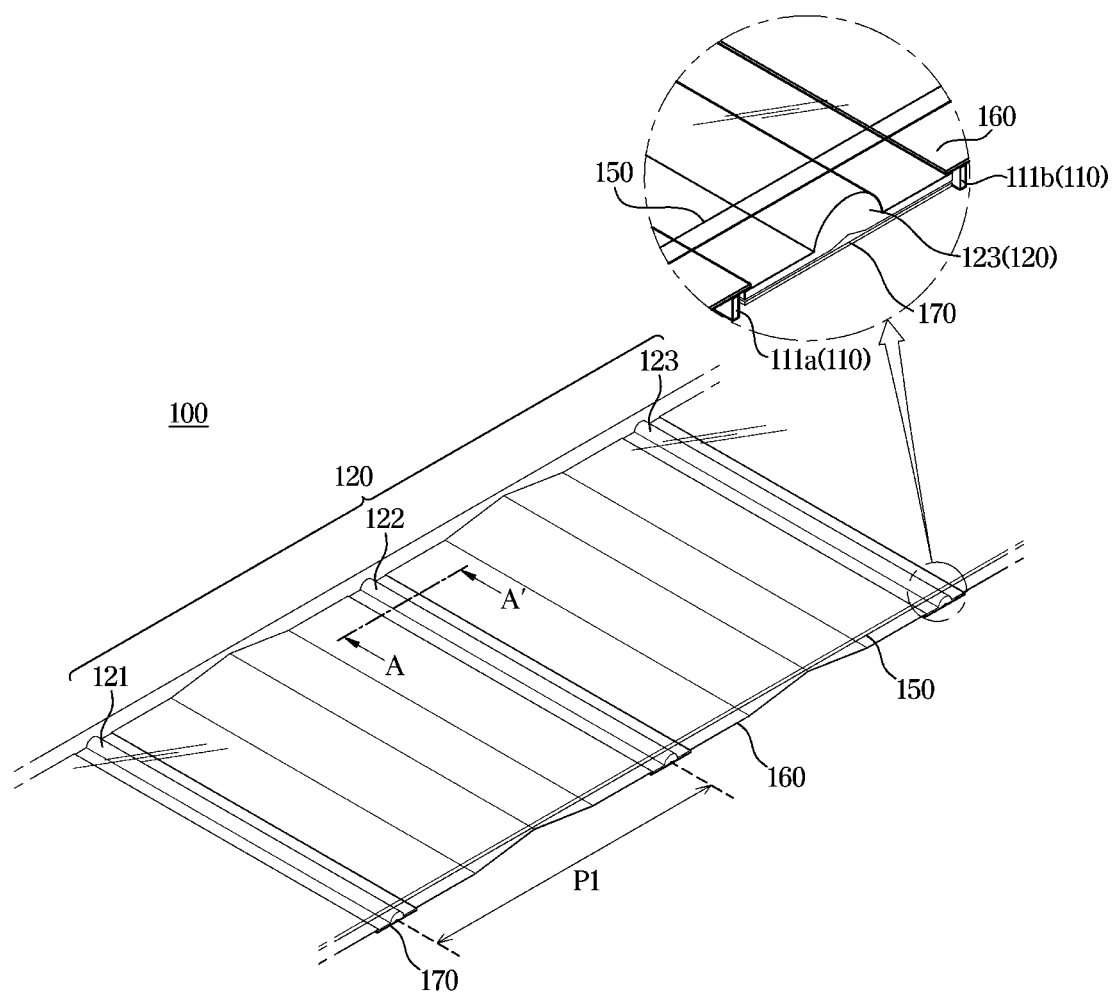
FIG. 3 is a perspective view of a backlight in the display apparatus according to an embodiment.
Figure 4:
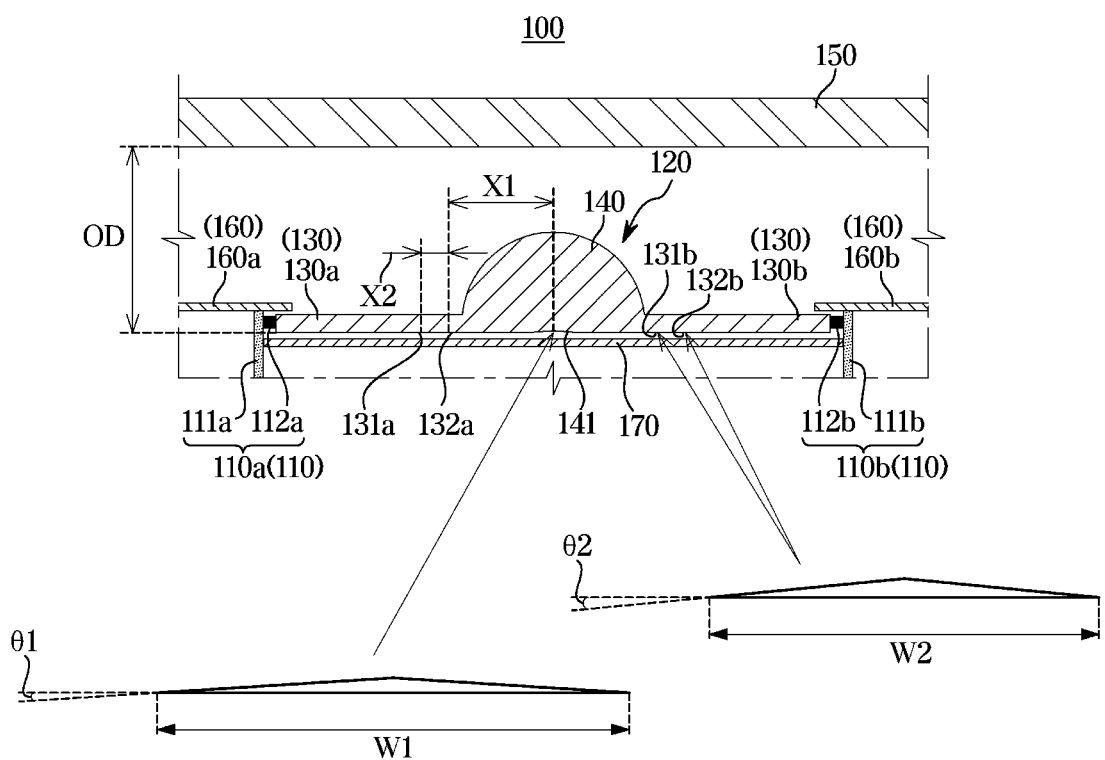
FIG. 4 is a cross-sectional view of the backlight in the display apparatus according to an embodiment.
Figure 5:
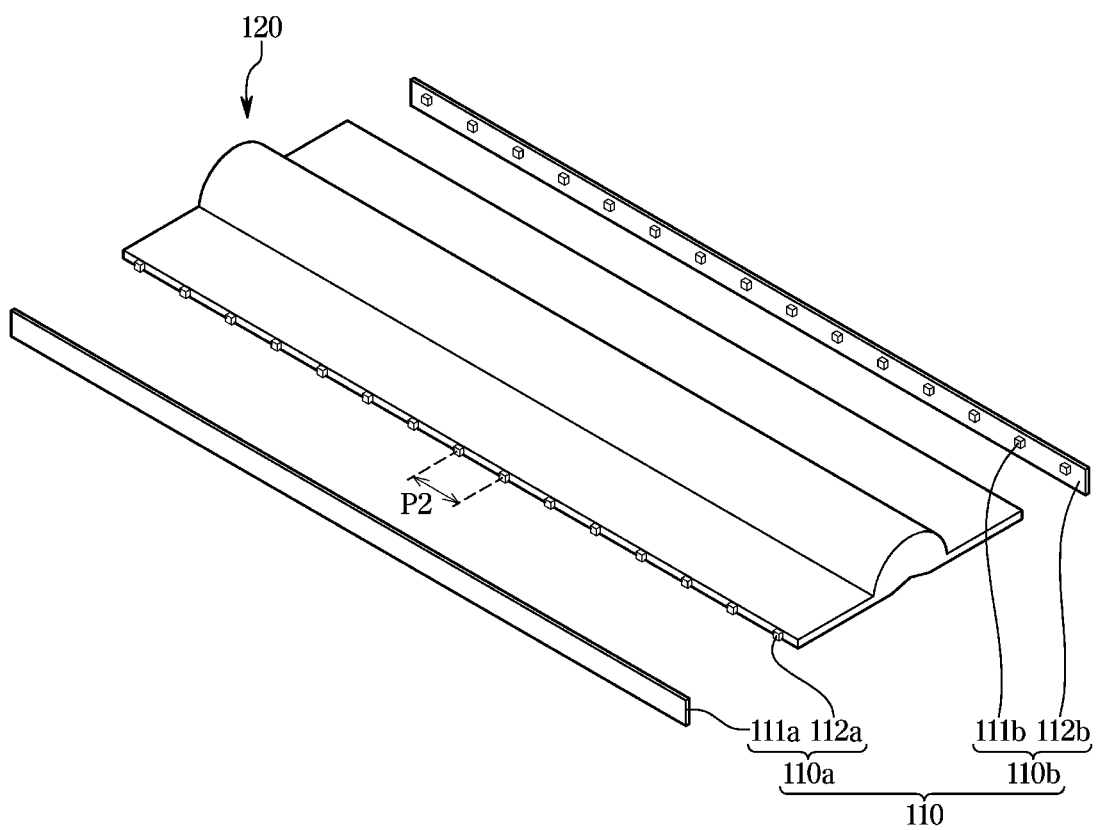
FIG. 5 is a perspective view of a light tunnel lens and light source arrays in the display apparatus according to an embodiment.

FIG. 3 is a perspective view of a backlight 100 in a display apparatus 1 according to an embodiment, FIG. 4 is a cross-sectional view of a backlight 100 in a display apparatus 1 according to an embodiment, and FIG. 5 is a perspective view of a light tunnel lens 120 and light source arrays 110 in a display apparatus 1 according to an embodiment.

Referring to FIG. 3, the backlight 100 may include a light source (e.g., light source array 110) that emits light to supply light to the display panel 10. The light source may include a substrate 111a, 111b disposed to face a side surface of the light tunnel lens 120, and a plurality of light emitting diodes 112 (refer to FIG. 5) mounted on the substrate 111a,111b to emit light toward the light tunnel lens 120. In the following description, the light source may include a light source array 110.

The plurality of light tunnel lenses 120 may be disposed to be spaced apart by a predetermined distance. For example, the plurality of light tunnel lenses 120 may be disposed to be spaced apart by a distance P1 along a direction parallel to the display panel 10. In other words, the plurality of light tunnel lenses 120 may have a first pitch P1 in the transverse direction. Therefore, there may be a gap of P1 between the first light tunnel lens 121 and the second light tunnel lens 122. For example, the first pitch P1 between the light tunnel lenses 120 may be 245 mm.

A plurality of the first reflection plates 160 may be provided. The plurality of first reflection plates 160 may be disposed between the plurality of light tunnel lenses 120. The first reflection plate 160 may be provided to reflect the light passing through the light tunnel lens 120 to the diffusion plate 150. The first reflection plate 160 may have a predetermined pattern such that the light passing through the light tunnel lens 120 is reflected toward the diffusion plate 150 disposed in the front of the first reflection plate 160. For example, as illustrated in FIG. 3, the first reflection plate 160 may include a groove having a triangular cross section. The groove of the triangular cross section may extend along a direction in which the light tunnel lens 120 extends. The groove of the triangular cross section may extend by a longitudinal length of the first reflection plate 160.

The second reflection plate 170 may be disposed in the rear of the light tunnel lens 120. The second reflection plate 170 may be provided in a size corresponding to the size of the light tunnel lens 120. The second reflection plate 170 may be provided to reflect the light emitted backward from the light tunnel lens 120 back to the light tunnel lens 120.

Hereinafter the backlight 100 according to an embodiment will be described in detail with reference to FIG. 4. In FIG. 4, rearward may indicate downward in the drawing.

The backlight 100 may include the diffusion plate 150 disposed in the rear of the display panel 10 to diffuse light.

The backlight 100 may include the light source 110 and the light tunnel lens 120 in the rear of the diffusion plate 150.

The light source 110 may include the substrate 111 disposed perpendicular to the diffusion plate 150, and the light emitting diodes 112 mounted on the substrate 111 to emit light.

The light source 110 may include a first light source 110a disposed on the left side of the light tunnel lens 120 in the drawing, and a second light source 110b disposed on the right side of the light tunnel lens 120 in the drawing.

According to an embodiment, the light emitting diode 112 may emit light in a direction parallel to the display panel 10 and the diffusion plate 150. A first light emitting diode 112a of the first light source 110a may emit light toward a first direction that is parallel to the diffusion plate 150. A second light emitting diode 112b of the second light source 110b may emit light toward a second direction that is parallel to the diffusion plate 150. The first direction may indicate a rightward direction in FIG. 4.

The second direction may indicate a leftward direction in FIG. 4.

The light tunnel lens 120 may include a light tunnel 130 for guiding the light emitted from the light source 110 in a direction parallel to the diffusion plate 150, and a lens 140 for diffusing the light guided by the light tunnel 130.

The light tunnel 130 may include a first light tunnel 130a connected to one side of the lens 140 and a second light tunnel 130b connected to the other side of the lens 140. In other words, the first light tunnel 130a may be connected to the left side surface of the lens 140, and the second light tunnel 130b may be connected to the right side surface of the lens 140.

The lens 140 may be disposed between the first light tunnel 130a and the second light tunnel 130b. The lens 140 may be connected to the first light tunnel 130a and the second light tunnel 130b. The first light tunnel 130a, the second light tunnel 130b, and the lens 140 may be integrally provided.

The light tunnel 130 may be provided in a plate shape facing the diffusion plate 150. The light tunnel 130 may be provided in a plate shape having a longitudinal length longer than a transverse length. The light tunnel 130 may guide the light emitted from the light source 110 in the direction parallel to the diffusion plate 150, The light tunnel 130 may guide the light emitted from the light source 110 in the transverse direction in FIG. 4.

According to an embodiment, the light tunnel 130 may be provided to have the same thickness from one end thereof to the other end thereof. In other words, the light tunnel 130 may maintain the same thickness from the first end facing the light emitting diodes 112 to a second end connected to the lens 140.

The lens 140 may be connected to the light tunnel 130 to diffuse the light guided by the light tunnel 130. The lens 140 may diffuse the light incident to the lens 140 through the light tunnel 130. In addition, the lens 140 may emit the light incident on the lens 140 toward the diffusion plate 150.

The lens 140 may be provided to have a convex shape toward the diffusion plate 150 or the display panel 10. The lens 140 may be provided in a semi-cylindrical shape extending in a direction parallel to the display panel 10 or the diffusion plate 150. The cross section of the lens 140 may be provided in a semi-elliptical shape. For example, the cross section of the lens 140 may have a semi-elliptical shape in which the length of a transverse axis is longer than the length of a longitudinal axis.

As described above, the first light emitting diode 112a of the first light source 110a may emit light in a direction parallel to the diffusion plate 150 toward the first light tunnel 130a, The light emitted from the first light emitting diode 112a may be guided in a direction parallel to the diffusion plate 150 by the first light tunnel 130a and may be incident on one side of the lens 140. The light incident on the one side of the lens 140 may be diffused inside the lens 140 and then emitted to the other side of the lens 140.

The light emitted from the second light emitting diode 112b may be incident on the other side of the lens 140. The light incident on the other side of the lens 140 may be diffused in the lens 140 and then emitted to the one side of the lens 140.

The light emitted from the light source 110 may pass through the light tunnel lens 120 and then be incident on the diffusion plate 150. The diffusion plate 150 may diffuse the light incident on the diffusion plate 150. The diffusion plate 150 may guide light such that the light incident on the diffusion plate 150 is emitted toward the display panel 10.

The first reflection plate 160 may be disposed between the light tunnel lens 120 and the diffusion plate 150. The first reflection plate 160 may include a left reflection plate 160a disposed on the left side of the light tunnel lens 120 and a right reflection plate 160b disposed on the right side of the light tunnel lens 120.

The first reflection plate 160 may be provided to reflect the light reflected backward by the diffusion plate 150 back toward the diffusion plate 150. When the light emitted to the right side of the light tunnel lens 120 is reflected backward by the diffusion plate 150, the right reflection plate 160b may reflect the backward reflected light back to the diffusion plate 150. When the light emitted to the left side of the light tunnel lens 120 is reflected backward by the diffusion plate 150, the left reflection plate 160a may reflect the backward reflected light back to the diffusion plate 150. Accordingly, the light emitted from the light source 110 may be supplied to the display panel 10 to the maximum.

The backlight 100 may further include the second reflection plate 170 disposed in the rear of the light tunnel lens 120.

The second reflection plate 170 may be disposed in the rear of the light tunnel lens 120 and may have a size corresponding to that of the light tunnel lens 120. The second reflection plate 170 may reflect the light emitted backward from the light tunnel lens 120 back to the light tunnel lens 120. The light reflected back to the light tunnel lens 120 may pass through the light tunnel lens 120 and the diffusion plate 150 and then be supplied to the display panel 10. Accordingly, the light emitted from the light source 110 may be supplied to the display panel 10 to the maximum.

The lens 140 may include a first fine pattern 141 guiding light such that the light incident on the lens 140 is emitted to the diffusion plate 150. The first fine pattern 141 may include a recess portion recessed toward the diffusion plate 150. The first fine pattern 141 may have a triangular cross section. The first fine pattern 141 may have a cross section of an isosceles triangle having a base length of W1. Further, the first fine pattern 141 may have a cross section of an isosceles triangle having a base angle of θ1.

The light tunnel 130 may include second fine patterns 131a, 131b and 132a, 132b provided on a rear surface of the light tunnel 130. A plurality of the second fine patterns 131a, 131b and 132a, 132b may be provided.

The second fine patterns 131a, 131b and 132a, 132b may have a triangular cross section. The second fine patterns 131 and 132 may have a cross section of an isosceles triangle having a base length of W2. Further, the second fine patterns 131a, 131b and 132a, 132b may have a cross section of an isosceles triangle having a base angle of θ2.

The distance between the first fine pattern 141 and the second fine pattern 132a, 132b may be X1. The distance between the second fine patterns 131a, 131b and 132a, 132b may be X2.

According to one or more embodiments, an optical distance OD between the light source 110 and the diffusion plate 150 may be a distance from a lower surface of the light tunnel 130 to a lower surface of the diffusion plate 150. The display apparatus 1 according to one or more embodiments may be made thin by reducing the optical distance OD. This is described in detail below.

FIG. 5 is a perspective view of a light tunnel lens 120 and light source arrays 110 in a display apparatus 1 according to an embodiment.

Referring to FIG. 5, the display apparatus 1 according to an embodiment may include the light tunnel lens 120 and the light source (e.g., light source array 110) that emits light horizontally toward the light tunnel 130 of the light tunnel lens 120.

The light source may include the substrate 111 extending along the direction in which the light tunnel lens 120 extends, and the plurality of light emitting diodes 112 mounted on the substrate 111 to emit light in the direction parallel to the display panel 10 toward the light tunnel 130.

The substrate 111 may be provided in a shape having a long length and a low height. The length of the substrate 111 may be provided to correspond to the length of the light tunnel lens 120. The height of the substrate 111 may be equal to or greater than the height of the light tunnel 130.

The plurality of light emitting diodes 112 may be arranged to have a predetermined second pitch P2. In other words, the distance between the plurality of light emitting diodes 112 may be P2. The second pitch P2 may have various lengths. For example, P2 may be 10 mm.

The substrate 111 and the plurality of light emitting diodes 112 arranged to be spaced apart from each other to have a predetermined pitch P2 on the substrate 111 as described above are referred to as a light source array 110.

According to one or more embodiments, the light source array 110 may be used as the light source. By using the light source array 110, the display apparatus 1 may have a reduced cost and increased productivity.

More specifically, a general direct type display apparatus may include a substrate having a size corresponding to the display panel. Recently, the size of the display panel has increased in size. When a substrate having a size corresponding to the display panel is used, the substrate may be enlarged according to the enlargement of the display panel, and the cost may increase due to the enlargement of the substrate.

In a related art, the cost is increased by using rotationally symmetric LEDs. In addition, when an error occurs in the alignment of the rotational symmetry LEDs, illumination uniformity is not secured. Therefore, the alignment of LEDs requires a lot of cost and time.

According to one or more embodiments, the size of the substrate 111 on which the light emitting diodes 112 are mounted may be greatly reduced, thereby reducing the cost. As described above, the substrate 111 may be configured to have only a length corresponding to the display panel 10 and to have a very small height. Accordingly, the total area of the substrate 111 may be very small in comparison with the area of the display panel 10. As the total area of the substrate 111 decreases, the price of the substrate 111 may be lowered and the cost of the display apparatus 1 may be reduced.

In addition, according to one or more embodiments, a light source array 110 may be provided. By using an asymmetrical LED chip array instead of a related art rotational symmetry LED, cost may be reduced. In addition, the alignment is easy, thereby reducing the time and cost used for assembly.

Figure 6:
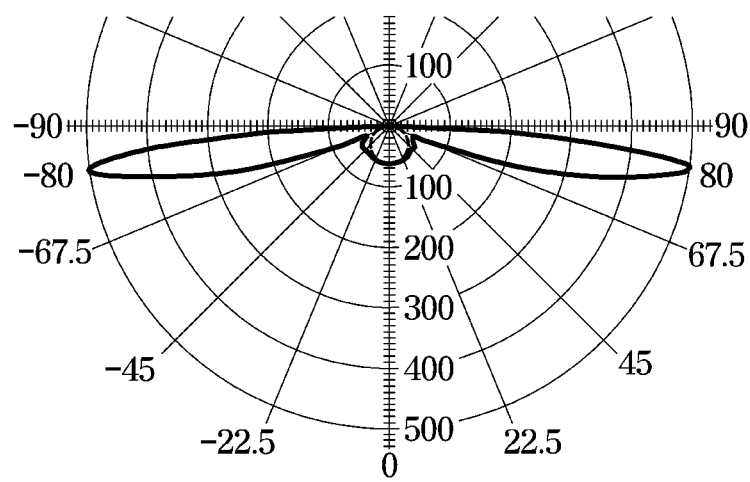
FIG. 6 is a graph illustrating a light distribution curve of the light tunnel lens in the display apparatus according to an embodiment.

FIG. 6 is a graph illustrating a light distribution curve of a light tunnel lens 120 in a display apparatus 1 according to an embodiment.

According to one or more embodiments, a display apparatus 1 capable of being made thinner by reducing the optical distance OD may be provided. In addition, according to one or more embodiments, a display apparatus 1 capable of implementing local dimming may be provided.

In general, in a direct type backlight, the light source emits light toward the diffusion plate. A related art display apparatus includes a lens that covers the light source and diffuses light to reduce the optical distance OD required between the light source and the diffusion plate. With such a lens, the light emitted toward the diffusion plate may be diffused in the range of approximately 130° with respect to a vertical axis.

According to one or more embodiments, the display apparatus 1 may include a light source that emits light in a direction parallel to the diffusion plate 150. In addition, the display apparatus 1 may include a light tunnel lens 120 for guiding the light emitted in the direction parallel to the diffusion plate 150 to the diffusion plate 150. According to one or more embodiments, the light tunnel lens 120 may diffuse the light emitted from the light source at approximately 160° with respect to a vertical axis perpendicular to the diffusion plate 150. Because light is emitted from the light source in the direction parallel to the diffusion plate 150, the light may be diffused at a wide angle with respect to the vertical axis by refracting the light at a relatively small angle in the light tunnel lens 120. By including the light tunnel lens 120 capable of diffusing light only at a very wide angle with respect to the vertical axis and the light source emitting light in a horizontal direction, the display apparatus 1 according to one or more embodiments may reduce the optical distance OD. By reducing the optical distance OD, the display apparatus 1 may be made thin. In addition, the display apparatus 1 may implement local dimming.

Figure 7:
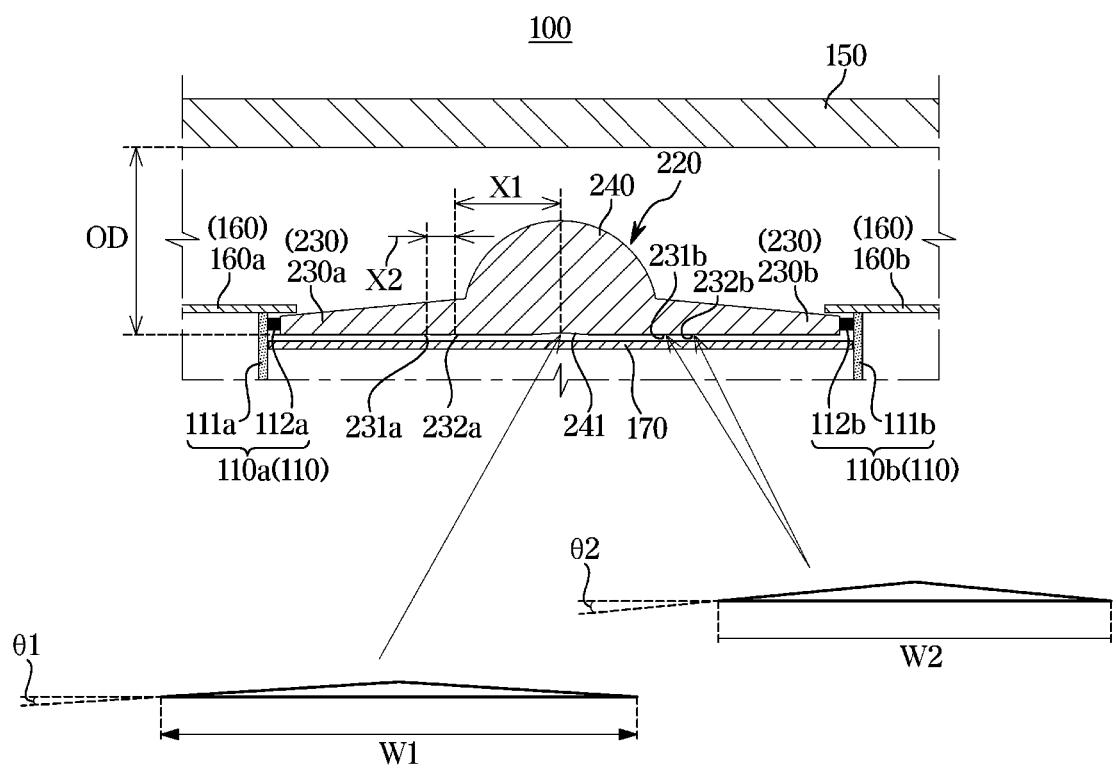
FIG. 7 is a cross-sectional view of a backlight in a display apparatus according to another embodiment.
Figure 8:
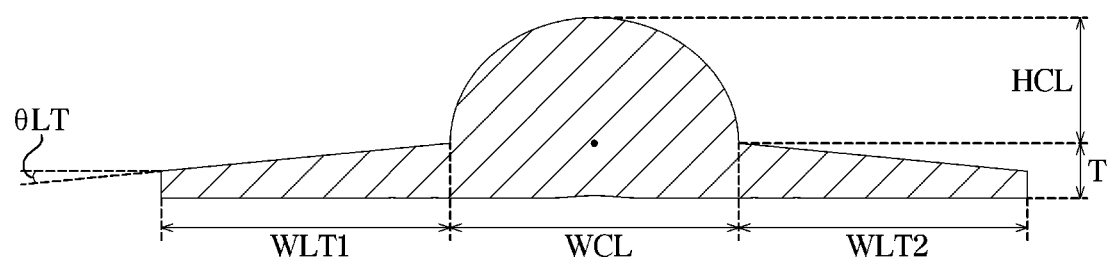
FIG. 8 is a cross-sectional view of a light tunnel lens in a display apparatus according to another embodiment.

FIG. 7 is a cross-sectional view of a backlight 100 in a display apparatus 1 according to another embodiment, and FIG. 8 is a cross-sectional view of a light tunnel lens 220 in a display apparatus 1 according to another embodiment.

Referring to FIGS. 7 and 8, another embodiment will be described. Redundant descriptions of features and/or components described above may be omitted below.

According to another embodiment, a light tunnel 230 may be provided to vary in thickness. Specifically, the light tunnel 230 (230a, 230b) may be provided such that its thickness becomes thicker gradually from a first end thereof facing the light emitting diode 112 to a second end thereof connected to the lens 240. Referring to FIG. 8, the light tunnel 230 may gradually increase in thickness with a slope of θ LT.

Hereinafter, specific numerical values of a light tunnel lens 220 according to an embodiment are described in detail.

Referring to FIGS. 4 and 7, the distance X1 between the first fine pattern 241 and the second fine pattern 232a, 232b may be 5.75 mm. The distance X2 between the second fine patterns 231a, 231b and 232a, 232b may be 1.5 mm.

The width W1 of the first fine pattern 241 may be 3.5 mm. The base angle θ1 of the first fine pattern 241 may be 3.6°. The width W2 of the second fine pattern 231a, 231b and 232a, 232b may be 0.75 mm. The base angle θ2 of the second fine pattern 231a, 231b and 232a, 232b may be 5.5°.

Referring to FIG. 8, a width direction length WLT1 of the first light tunnel may be 10 mm. The slope θLT of an upper surface of the first light tunnel may be 6°. A width direction length WLT2 of the second light tunnel may be 10 mm like the first light tunnel. The slope θLT of an upper surface of the second light tunnel may be 6°. In addition, a maximum thickness T of the light tunnel may be 2 mm.

As described above, the lens 240 may have a semi-elliptical shape in cross section. A long axis length WCL of the lens 240 may be 10 mm. In other words, the maximum transverse length of the lens may be 10 mm. Because the lens 240 has a semi-elliptical shape, a lens height HCL corresponding to half of a short axis length of the lens may be 4.35 mm.

As is apparent from the above, according to one or more embodiments, a display apparatus 1 including a backlight 100 capable of implementing local dimming can be provided.

Further, according to one or more embodiments, a display apparatus 1 capable of being made thinner by reducing an optical distance OD can be provided.

Although a few embodiments have been shown and described, it would be appreciated by those skilled in the art that changes may be made in these embodiments without departing from the principles and spirit of the disclosure, the scope of which is defined at least in the claims and their equivalents.

What is claimed is:

1. A display apparatus comprising:
   a display panel;
   a light source configured to emit light toward a first direction parallel to a front surface of the display panel in order to supply the light to the display panel; and
   a light tunnel lens comprising:
      at least one light tunnel configured to guide the light emitted from the light source in the first direction, and
      a lens configured to be connected to the at least one light tunnel to diffuse the light guided by the at least one light tunnel,
   wherein the at least one light tunnel comprises a first light tunnel connected to a first end of the lens in the first direction and a second light tunnel connected to a second end of the lens in the first direction.

2. The display apparatus according to claim 1, wherein:
   the light source comprises a first light source configured to emit the light toward the first light tunnel and a second light source configured to emit the light toward the second light tunnel;
   the light emitted from the first light source is guided by the first light tunnel to be incident on one side of the lens and then emitted to another side of the lens; and
   the light emitted from the second light source is guided by the second light tunnel to be incident on the other side of the lens and then emitted to the one side of the lens.

3. The display apparatus according to claim 1, wherein:
   the light source includes a plurality of light emitting diodes; and
   the plurality of light emitting diodes is spaced apart from each other along a second direction crossing the first direction and parallel to the front surface of the display panel.

4. The display apparatus according to claim 1, wherein the lens has a convex shape toward the display panel.

5. The display apparatus according to claim 4, wherein the lens has an elliptical cross section in which a length of a transverse axis is longer than a length of a longitudinal axis.

6. The display apparatus according to claim 1, further comprising a diffusion plate between the display panel and the light tunnel lens and configured to diffuse light emitted from the lens and emit the light toward the display panel.

7. The display apparatus according to claim 6, further comprising a first reflection plate between the diffusion plate and the at least one light tunnel and configured to reflect the light emitted by the diffusion plate back toward the diffusion plate.

8. The display apparatus according to claim 7, further comprising a second reflection plate disposed in the rear of the light tunnel lens and configured to reflect the light emitted backward from the light tunnel lens back toward the light tunnel lens.

9. The display apparatus according to claim 1, wherein the lens includes a first fine pattern configured to guide light incident on the lens to be emitted toward the display panel.

10. The display apparatus according to claim 9, wherein the at least one light tunnel includes a second fine pattern provided at a rear surface of the at least one light tunnel to guide the light to be emitted to a front side.

11. The display apparatus according to claim 1, wherein the lens and the at least one light tunnel are integrally provided.

12. The display apparatus according to claim 1, further comprising:
   a plurality of light tunnel lenses including the light tunnel lens,
   wherein the plurality of light tunnel lenses is arranged to be spaced apart from each other along the first direction.

13. The display apparatus according to claim 1, wherein:
   the at least one light tunnel includes a first end connected to the lens and a second end on which the light from the light source is incident; and
   the at least one light tunnel decreases in thickness from the first end toward the second end.

14. The display apparatus according to claim 1, wherein:
   the at least one light tunnel includes a first end connected to the lens and a second end on which the light from the light source is incident; and
   the at least one light tunnel has a same thickness from the first end to the second end.

15. A display apparatus comprising:
   a display panel configured to output an image to a front surface thereof; and
   a backlight disposed in a rear of the display panel to supply light to the display panel,
   wherein the backlight comprises:
      a light source array disposed along a first direction parallel to the display panel and configured to emit light in a second direction crossing the first direction and parallel to the front surface of the display panel;
      at least one light tunnel extending along the first direction to correspond to the light source array and configured to guide the light emitted from the light source array in the second direction; and
      a lens connected to the at least one light tunnel and configured to guide the light guided by the at least one light tunnel to be emitted toward a rear surface of the display panel,
   wherein the lens has a semi-cylindrical shape extending along the first direction.

16. The display apparatus according to claim 15, wherein the at least one light tunnel comprises a first light tunnel connected to one end of the lens in the first direction and a second light tunnel connected to another end of the lens in the first direction.

17. The display apparatus according to claim 16, wherein:
   the light source array comprises a first light source array configured to emit the light toward the first light tunnel and a second light source array configured to emit the light toward the second light tunnel;
   the light emitted from the first light source array is guided by the first light tunnel to be incident on one side of the lens and then emitted to another side of the lens; and
   the light emitted from the second light source array is guided by the second light tunnel to be incident on the other side of the lens and then emitted to the one side of the lens.

18. A display apparatus comprising:
- a display panel configured to output an image to a front surface thereof;
- a diffusion plate disposed in a rear of the display panel to diffuse light;
- at least one light tunnel disposed in a rear of the diffusion plate to face the diffusion plate and configured to guide the light in a direction parallel to the diffusion plate;
- a lens connected to the at least one light tunnel to diffuse the light guided by the at least one light tunnel and to guide the light to the diffusion plate; and
- a light source configured to supply the light to the display panel and to emit the light toward a side of the at least one light tunnel,
- wherein the at least one light tunnel comprises a first light tunnel connected to one end of the lens and a second light tunnel connected to another end of the lens.

* * * * *